US012621597B2

(12) United States Patent
Lin

(10) Patent No.: US 12,621,597 B2
(45) Date of Patent: May 5, 2026

(54) WEARABLE DEVICE ASSEMBLY

(71) Applicant: VIVO MOBILE COMMUNICATION CO., LTD., Dongguan (CN)

(72) Inventor: Zhenye Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 347 days.

(21) Appl. No.: 18/083,005

(22) Filed: Dec. 16, 2022

(65) Prior Publication Data

US 2023/0124744 A1 Apr. 20, 2023

Related U.S. Application Data

(63) Continuation of application No. PCT/CN2021/100251, filed on Jun. 16, 2021.

(30) Foreign Application Priority Data

Jun. 19, 2020 (CN) .......................... 202010571327.X

(51) Int. Cl.
H04R 1/10 (2026.01)
G02C 11/00 (2006.01)

(52) U.S. Cl.
CPC ........... H04R 1/1066 (2013.01); G02C 11/10 (2013.01); H04R 1/1041 (2013.01)

(58) Field of Classification Search
CPC .... H04R 1/1066; H04R 1/1041; H04R 1/105; H04R 1/1016; H04R 1/1008; H04R 1/10;
(Continued)

(56) References Cited

U.S. PATENT DOCUMENTS 7,613,292 B2 * 11/2009 te Riet ................. H04R 1/1066
379/430
7,735,996 B2 6/2010 Van Der Zwan et al.
(Continued)

FOREIGN PATENT DOCUMENTS

CN 101297592 A 10/2008
CN 201153320 Y 11/2008
(Continued)

*Primary Examiner* — Ahmad F. Matar
*Assistant Examiner* — Sabrina Diaz
(74) *Attorney, Agent, or Firm* — The Webb Law Firm

(57) ABSTRACT

A wearable device assembly includes a wireless earphone and smart glasses. The wireless earphone includes an earphone body and a speaker part. The earphone body is rotatably connected to the speaker part. The earphone body is rotatably switched between a first position and a second position relative to the speaker part, and provided with a first electrical connection part. The smart glasses include glasses legs and a battery module. One of the glasses legs is provided with a second electrical connection part, the second electrical connection part is electrically connected to the battery module. When the earphone body is located at the first position, the earphone body is separated from a glasses leg. When the earphone body is located at the second position, the earphone body is connected to the glasses leg, and the first electrical connection part is electrically connected to the second electrical connection part.

11 Claims, 7 Drawing Sheets

(58) Field of Classification Search

CPC .. H04R 1/1058; H04R 1/1075; H04R 1/1091; H04R 5/033; H04R 5/0335; H04R 2201/10; H04R 2205/022; G02C 11/10

USPC ........................................ 381/374, 380, 376

See application file for complete search history.

(56) References Cited

U.S. PATENT DOCUMENTS

| | | | |
|---|---|---|---|
| 9,143,853 B2 * | 9/2015 | Sorensen ............. | H04R 1/1041 |
| 10,816,812 B2 | 10/2020 | Silfvast et al. | |
| 2007/0064969 A1 * | 3/2007 | Chou ................... | H04R 1/1066 |
| | | | 381/381 |
| 2007/0201000 A1 | 8/2007 | Jackson et al. | |
| 2008/0144854 A1 | 6/2008 | Abreu | |
| 2009/0067652 A1 * | 3/2009 | Schmidt ............... | H04R 25/556 |
| | | | 381/314 |
| 2010/0061579 A1 | 3/2010 | Rickards et al. | |
| 2014/0003638 A1 * | 1/2014 | Barth .................. | H04R 25/607 |
| | | | 381/314 |
| 2014/0363033 A1 | 12/2014 | Heiman et al. | |
| 2016/0249124 A1 | 8/2016 | Drinkwater et al. | |

| | | | |
|---|---|---|---|
| 2018/0014105 A1 | 1/2018 | Abreu | |
| 2018/0098146 A1 * | 4/2018 | Lin ...................... | H04R 1/1083 |
| 2020/0089008 A1 * | 3/2020 | Silfvast ............... | G02B 27/017 |

FOREIGN PATENT DOCUMENTS

| | | | | |
|---|---|---|---|---|
| CN | 104793351 A | 7/2015 | | |
| CN | 204631389 U | 9/2015 | | |
| CN | 204721552 U | 10/2015 | | |
| CN | 204832705 U | 12/2015 | | |
| CN | 105634069 A | 6/2016 | | |
| CN | 206302532 U | 7/2017 | | |
| CN | 107027078 A | 8/2017 | | |
| CN | 209343065 U | 9/2019 | | |
| CN | 110361875 A | 10/2019 | | |
| CN | 209728336 U | 12/2019 | | |
| CN | 210401900 U | 4/2020 | | |
| CN | 111698603 A | 9/2020 | | |
| CN | 111781750 A | * 10/2020 | ............ | G02C 11/00 |
| KR | 1020120105270 A | 9/2012 | | |
| KR | 1020170071176 A | 6/2017 | | |
| KR | 1020190131704 A | 11/2019 | | |
| TW | M242712 U | 9/2004 | | |
| WO | 2016167877 A1 | 10/2016 | | |

* cited by examiner

WEARABLE DEVICE ASSEMBLY

CROSS-REFERENCE TO RELATED APPLICATIONS

This application is a Bypass Continuation Application of PCT/CN2021/100251 filed on Jun. 16, 2021, which claims priority to Chinese Patent Application No. 202010571327.X filed on Jun. 19, 2020, the disclosures of which are hereby incorporated by reference in their entirety.

BACKGROUND OF THE INVENTION

Field of the Invention

This disclosure relates to the technical field of smart wearable devices, and in particular, to a wearable device assembly.

Description of Related Art

In today's society, various electronic products emerge in endlessly. In order to avoid disturbing the surrounding environment while users are enjoying the convenient electronic products, earphones cannot be ignored. In response to the rapid development of science and technology in recent years, wireless earphones gradually appeared in people's life. Wireless earphones are favored by users due to their portability, which can resolve various inconveniences of traditional wired earphones.

Currently, increasing functions are integrated on the wireless earphones, which causes high power consumption of the wireless earphones. In addition, since the wireless earphones are relatively small, batteries disposed on the wireless earphones are relatively small, and therefore capacities of the batteries are relatively small. As a result, an endurance of the wireless earphones is insufficient. Therefore, in order to realize a relatively long endurance of the wireless earphones, the existing wireless earphones generally need to be equipped with an earphone box. The earphone box is provided with a battery, so that the earphone box can charge the wireless earphones. However, the wireless earphones are placed in the earphone box during charging. At this time, users cannot wear the wireless earphones and therefore cannot use the wireless earphones, which affects the user experience.

SUMMARY OF THE INVENTION

Embodiments of this disclosure provide a wearable device assembly, including a wireless earphone and smart glasses, where the wireless earphone includes an earphone body and a speaker part, the earphone body is rotatably connected to the speaker part, the earphone body is rotatably switched between a first position and a second position relative to the speaker part, and the earphone body is provided with a first electrical connection part;

the smart glasses include glasses legs and a battery module, one of the glasses legs is provided with a second electrical connection part, and the second electrical connection part is electrically connected to the battery module; and in a case that the earphone body is located at the first position, the earphone body is separated from a glasses leg, and in a case that the earphone body is located at the second position, the earphone body is connected to the glasses leg, and the first electrical connection part is electrically connected to the second electrical connection part.

DESCRIPTIONS OF REFERENCE NUMERALS

100—Wireless earphone, 110—Earphone body, 111—First electrical connection part, 111*a*—First electrical connection terminal, 111*b*—First connection member, 120—Speaker part;

200—Smart glasses, 210—Glasses leg, 211—Second electrical connection part, 211*a*—Second electrical connection terminal, 211*b*—Second connection member.

DESCRIPTION OF THE INVENTION

To clearly states the objectives, technical solutions, and advantages of this disclosure, the technical solutions of this disclosure will be clearly described below with reference to embodiments of this disclosure and the accompanying drawings. Apparently, the described embodiments are merely a part rather than all of the embodiments of this disclosure. All other embodiments obtained by a person of ordinary skill in the art based on the embodiments of this disclosure shall fall within the protection scope of this disclosure.

The specification and claims of this disclosure, and terms "first" and "second" are used to distinguish similar objects, but are not used to describe a specific sequence or order. It is to be understood that the data termed in such a way are interchangeable in appropriate circumstances, so that the embodiments of this disclosure can be implemented in orders other than the order illustrated or described herein. In addition, the objects distinguished by "first", "second", etc. are usually one type, and the number of objects is not limited. For example, there may be one or more first objects. In addition, "and/or" in the description and the claims means at least one of the connected objects, and the character "/" generally indicates an "or" relationship between the associated objects.

The technical solutions disclosed in the embodiments of this disclosure are described below through some embodiments and disclosure scenarios thereof with reference to the accompanying drawings.

Figure 1:
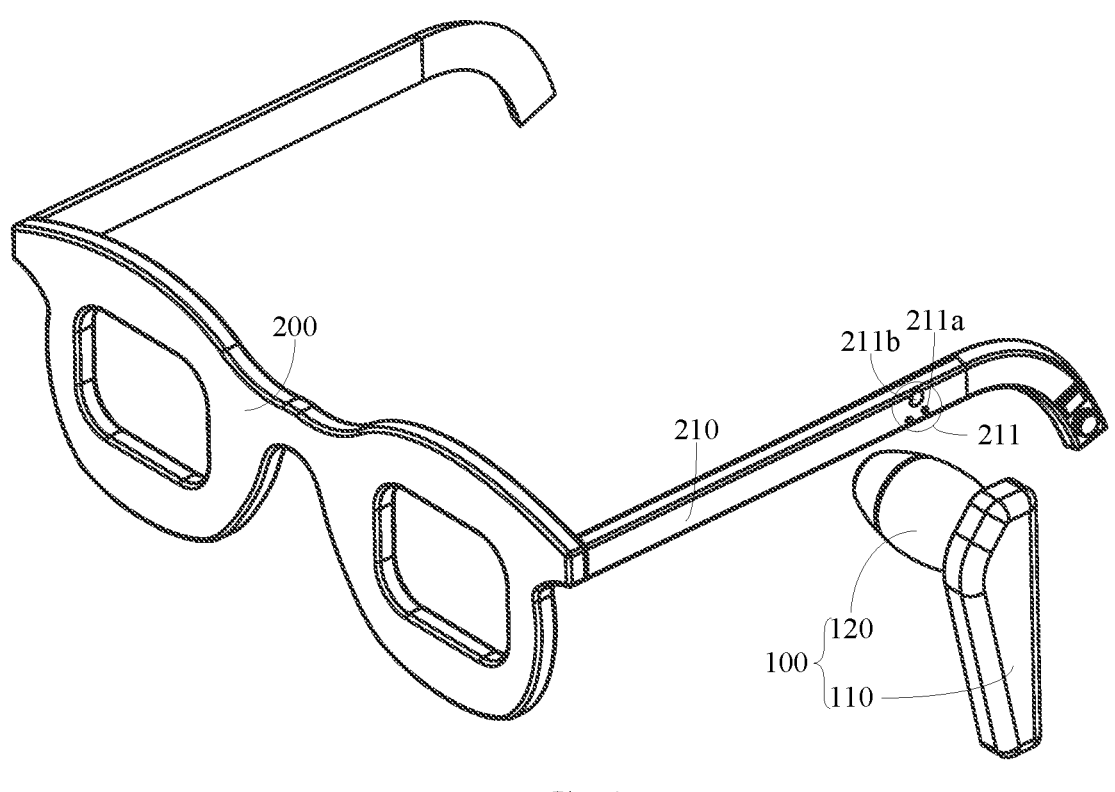
FIG. 1 is a schematic diagram of a wearable device assembly with an earphone body being at a first position according to an embodiment of this disclosure.
Figures 2, 3:
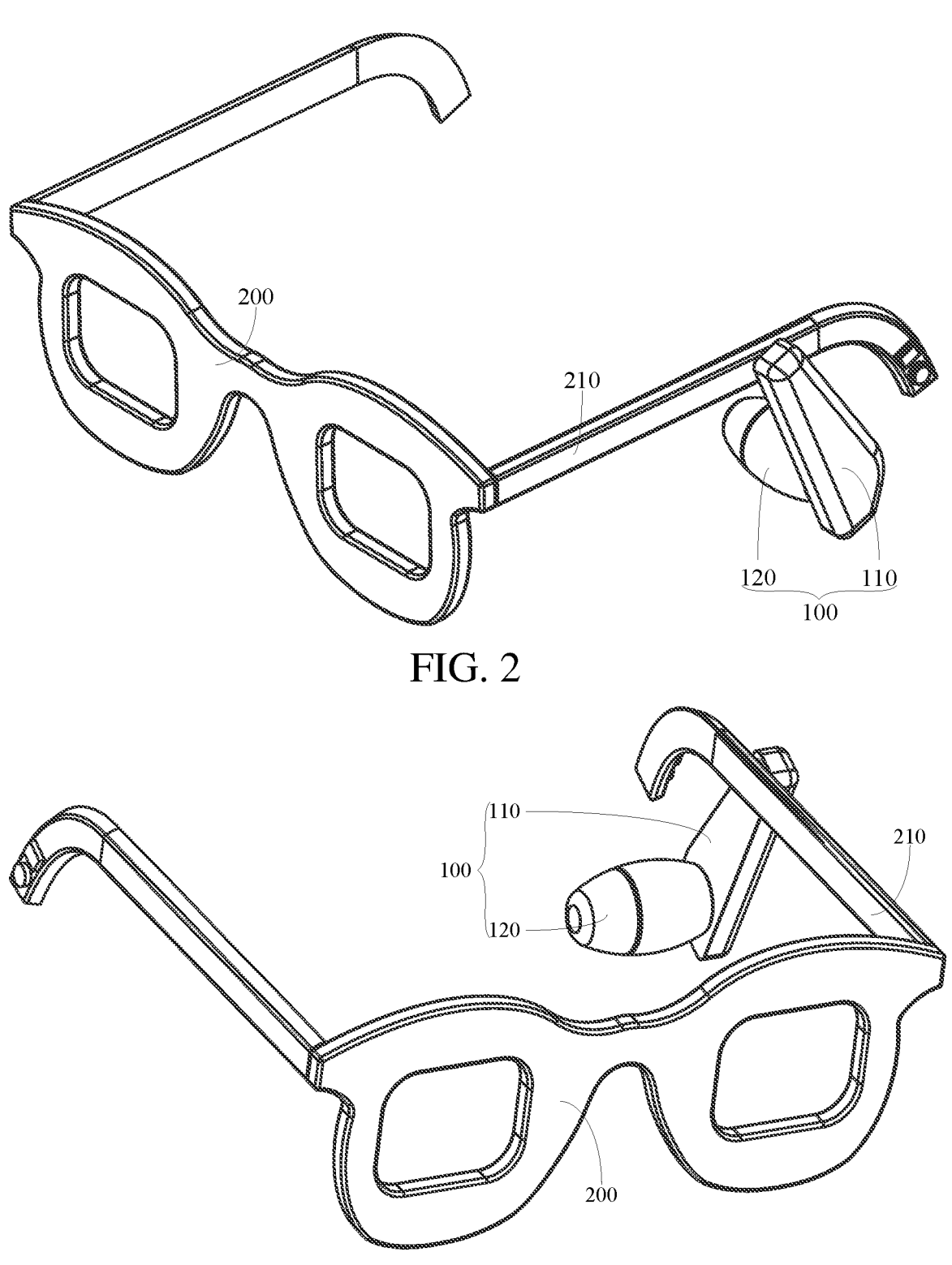
FIG. 2 is a schematic diagram of the wearable device assembly with the earphone body being at a second position according to an embodiment of this disclosure.
FIG. 3 is a schematic diagram of FIG. 2 from another perspective.
Figure 4:
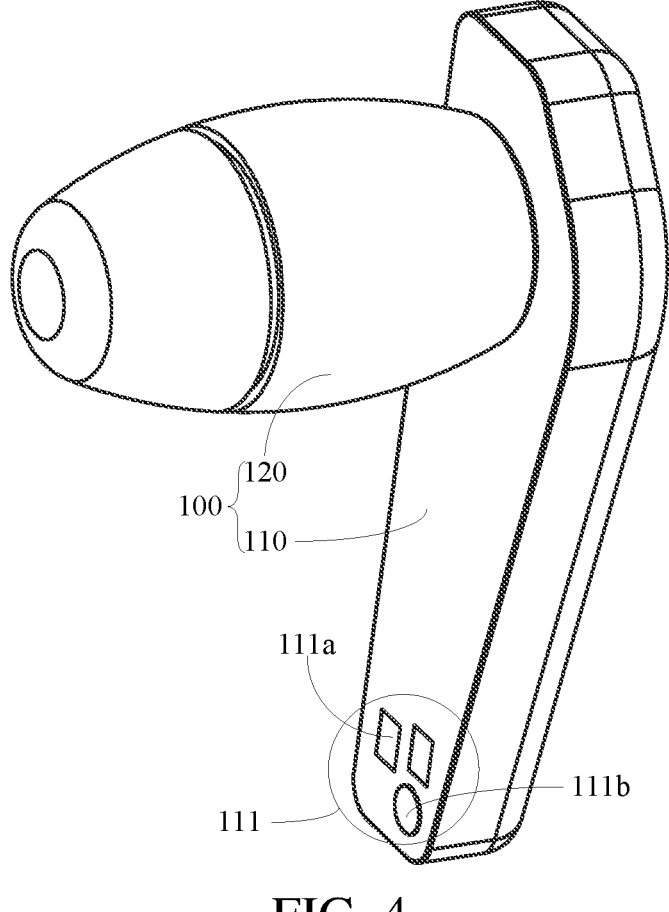
FIG. 4 is a schematic diagram of a wireless earphone according to an embodiment of this disclosure.
Figure 5:
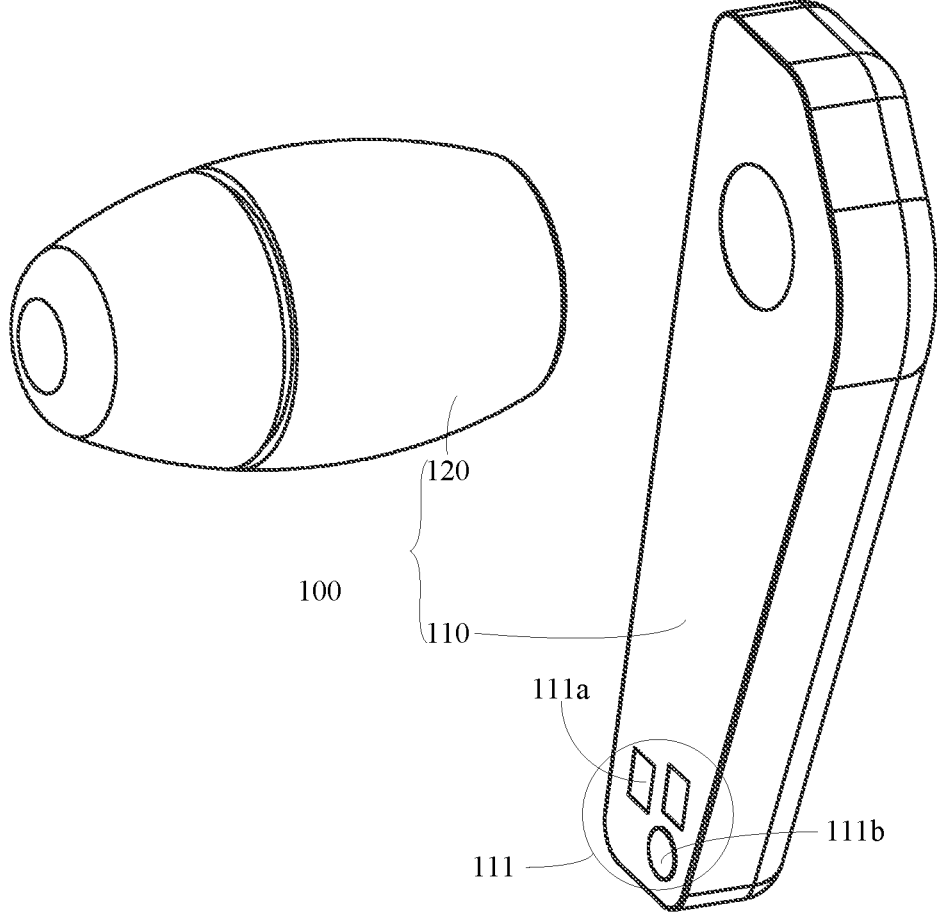
FIG. 5 is a schematic exploded view of the wireless earphone according to an embodiment of this disclosure.
Figure 6:
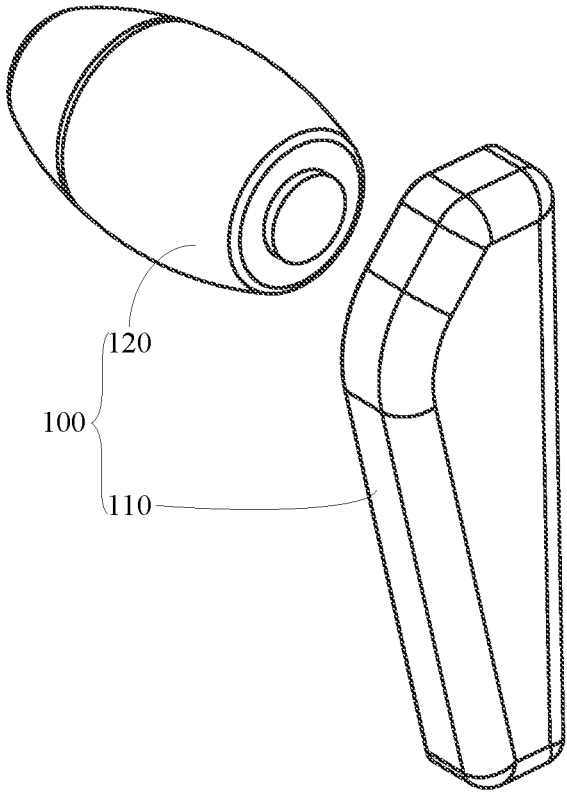
FIG. 6 is a schematic diagram of FIG. 5 from another perspective.
Figure 7:
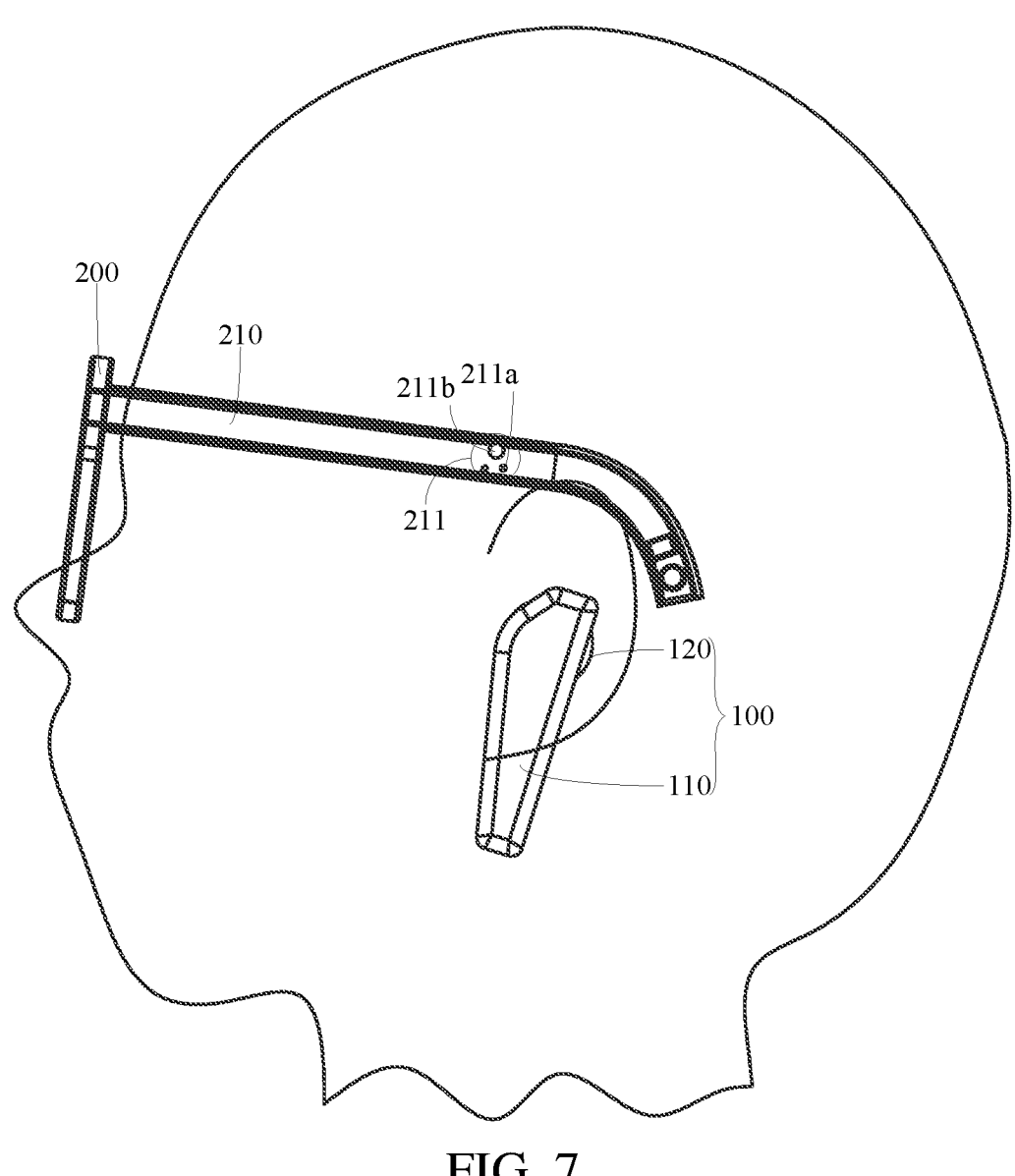
FIG. 7 is a schematic diagram of using the wearable device assembly by a user.
Figure 8:
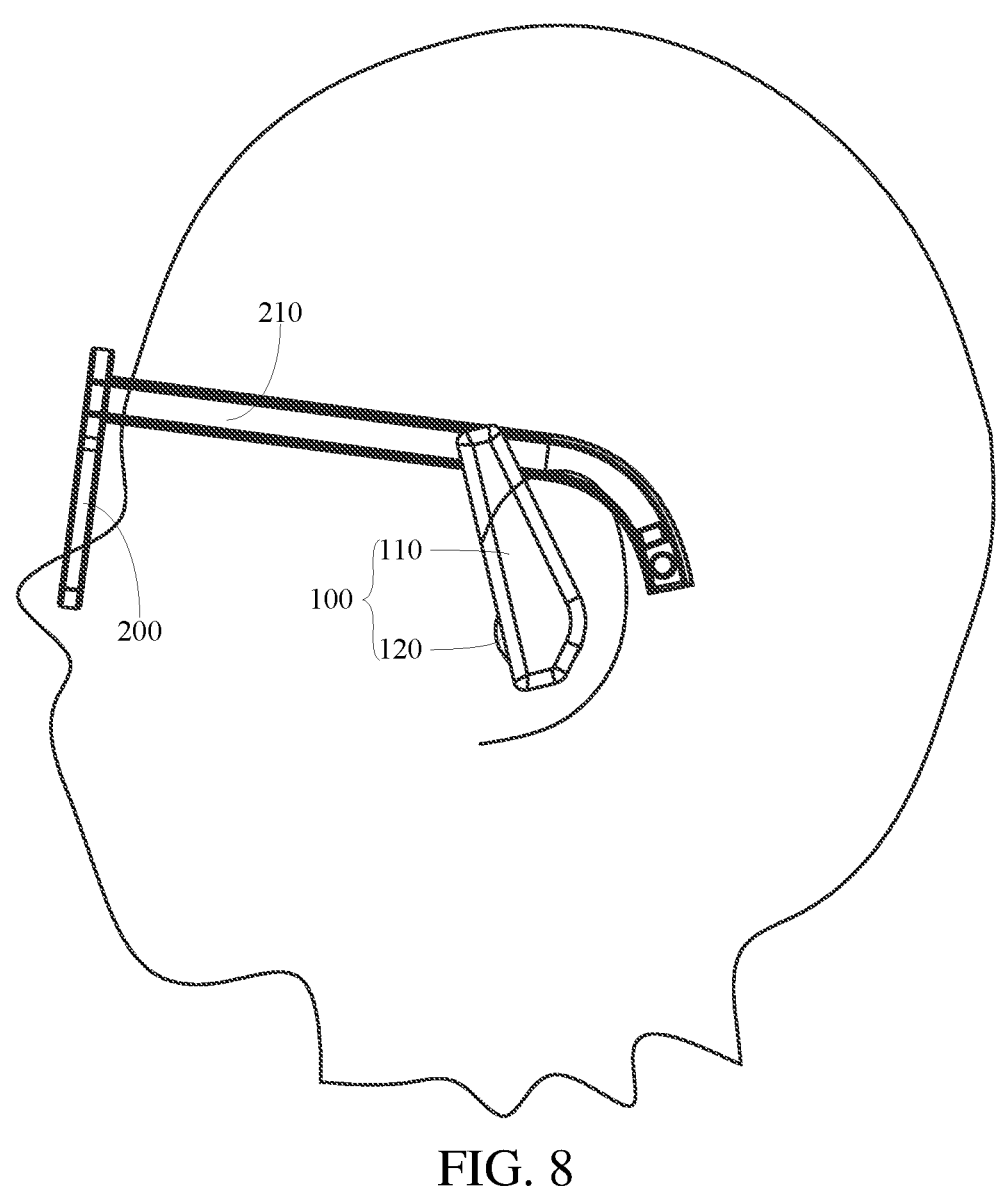
FIG. 8 is another schematic diagram of using the wearable device assembly by a user.

Referring to FIG. 1 to FIG. 8, an embodiment of this disclosure discloses a wearable device assembly. The disclosed wearable device assembly includes a wireless earphone 100 and smart glasses 200.

The wireless earphone 100 includes an earphone body 110 and a speaker part 120. The earphone body 110 is rotatably connected to the speaker part 120. The earphone body 110 may be rotatably connected to the speaker part 120 in various ways. For example, the earphone body 110 may be hinged to the speaker part 120, or the earphone body 110 is connected to the speaker part 120 by a plastic connection member. Since the plastic connection member has desirable plasticity, the plastic connection member can be easily deformed and restored to the original shape by an external force. For example, the plastic connection member may be deformed to rotate the earphone body 110 relative to the speaker part 120. Certainly, the plastic connection member can be kept in the original shape when free of an external force, so that the earphone body 110 can be kept in the rotation position for a relatively long time and does not change. Finally, the plastic connection member may be restored to an original position by an external force. Various types of plastic connection members may be used, such as a memory metal strip. This is not limited in this embodiment of this disclosure.

The earphone body 110 is rotatably switched between the first position and the second position relative to the speaker part 120, and the earphone body 110 is provided with a first electrical connection part 111. The first electrical connection part 111 can rotate with the earphone body 110, to change a position of the first electrical connection part 111. A user may supply power to or charge the earphone body 110 through the first electrical connection part 111. Certainly, the earphone body 110 may be connected to other electronic devices through the first electrical connection part 111 for data transfer.

The smart glasses 200 include glasses legs 210 and a battery module. The smart glasses 200 generally further include an optical module support, which is connected to one of the glasses legs 210. At least one of the glasses leg 210 and the optical module support is provided with the battery module. Optionally, both the glasses leg 210 and the optical module support are provided with the battery module, so that a battery capacity of the smart glasses 200 is relatively large. In this way, the smart glasses 200 have a relatively long endurance. The glasses leg 210 is provided with a second electrical connection part 211. The second electrical connection part 211 is electrically connected to the battery module, so that the user may charge the battery module through the second electrical connection part 211, or the battery module may charge other devices through the second electrical connection part 211. Certainly, the smart glasses 200 may be connected to other electronic devices through the second electrical connection part 211 for data transfer.

In a case that the earphone body 110 is located at the first position, the earphone body 110 is separated from the glasses leg 210. At this time, the wireless earphone 100 and the smart glasses 200 work independently of each other, and the wireless earphone 100 does not need to be charged or needs power supply by the smart glasses 200, or the wireless earphone 100 does not need to be connected to the smart glasses 200 for data transfer. In a case that the earphone body 110 is located at the second position, the earphone body 110 is connected to the glasses leg 210, and the first electrical connection part 111 is electrically connected to the second electrical connection part 211. At this time, the smart glasses 200 charge or supply power to the earphone body 110 through the first electrical connection part 111 and the second electrical connection part 211, or the smart glasses 200 are connected to the wireless earphone 100 through the first electrical connection part 111 and the second electrical connection part 211 for data exchange, so that the smart glasses 200 and the wireless earphone 100 can realize data exchange.

During operation of the wearable device assembly, when the wireless earphone 100 needs to be charged, the user may manually drive the earphone body 110 to rotate, so that the earphone body 110 is rotated to the second position, the earphone body 110 is connected to the glasses leg 210, and the first electrical connection part 111 is electrically connected to the second electrical connection part 211. At this time, the smart glasses 200 charge or supply power to the earphone body 110 through the first electrical connection part 111 and the second electrical connection part 211. The user can still use the wireless earphone 100 during the charging or power supply of the wireless earphone 100 in this manner. When charging of the wireless earphone 100 is completed or the wireless earphone does not need power supply, the user may manually drive the earphone body 110 to rotate, so that the earphone body 110 is rotated from the second position to the first position, and the earphone body 110 is separated from the glasses leg 210. Therefore, the wireless earphone 100 and the smart glasses 200 work independently of each other.

In the wearable device assembly provided in this disclosure, the earphone body 110 is rotatably switched between the first position and the second position relative to the speaker part 120, in a case that the earphone body 110 is located at the first position, the earphone body 110 is separated from the glasses leg 210, and in a case that the earphone body 110 is located at the second position, the earphone body 110 is connected to the glasses leg 210, and the first electrical connection part 111 is electrically connected to the second electrical connection part 211. The charging or power supply of the wireless earphone 100 may be realized by changing the position of the earphone body 110, and the wireless earphone 100 is charged or powered by the smart glasses 200, so that the user can still use the wireless earphone 100 during the charging or power supply of the wireless earphone 100 in this manner. Therefore, a problem that the user cannot wear and use the wireless earphone 100 as a result of a need of placing the wireless earphone 100 in an earphone box for charging is resolved, thereby improving the user experience.

In this embodiment of this disclosure, the earphone body 110 is rotatably switched between the first position and the second position relative to the speaker part 120. For relatively effective electrical connection between the earphone body 110 and the speaker part 120 during the rotation of the earphone body 110, in an optional embodiment, the earphone body 110 may be electrically connected to the speaker part 120 through a flexible circuit board. During the rotation of the earphone body 110, the flexible circuit board can realize relatively effective electrical connection between the earphone body 110 and the speaker part 120 by virtue of its flexibility, to prevent the electrical connection between the earphone body 110 and the speaker part 120 from failing during the rotation of the earphone body 110, so that a failure of extracting sound information through the speaker part 120 by the user is prevented, thereby improving the usage reliability of the wireless earphone 100.

As described above, the earphone body 110 may be rotatably connected to the speaker part 120 in various ways. Optionally, one of the earphone body 110 and the speaker part 120 may be provided with a connection hole, and another is provided with a connection shaft. The connection shaft is connected to the connection hole, and the connection shaft is rotatably matched with the connection hole. For example, the earphone body 110 may be provided with a connection hole, and the speaker part 120 may be provided with a connection shaft. Certainly, the earphone body 110 may be provided with a connection shaft, and the speaker part 120 may be provided with a connection hole. This is not limited in this embodiment of the present invention. Arranging a connection hole or a connection shaft on the earphone body 110 or on the speaker part 120 is convenient and simple. In addition, the rotatable connection between the connection shaft and connection hole is relatively reliable, so that the earphone body 110 can be rotatably switched between the first position and the second position relative to the speaker part 120 stably, which helps the user realize the electrical connection between the first electrical connection part 111 and the second electrical connection part 211 by rotating the earphone body 110, thereby helping the user charge the wireless earphone 100.

During the charging of the wireless earphone 100, the earphone body 110 needs to be kept at the second position for a relatively long time. Based on the above, in an optional embodiment, one of an inner wall of the connection hole and an outer wall of the connection shaft may be provided with a plurality of elastic protrusions, another may be provided with a limiting groove, and the elastic protrusions may be limited in and matched with the limiting groove in a rotation direction of the earphone body 110. When the wireless earphone 100 needs to be charged, the user merely needs to manually drive the earphone body 110 to rotate. When the earphone body 110 is rotated, the elastic protrusions are elastically deformed, so that the user can drive the earphone body 110 to rotate. After the earphone body 110 is rotated to the second position, the elastic protrusions are restored to a shape before the deformation, and can be limited in and matched with the limiting groove in the rotation direction of the earphone body 110, to prevent a difficulty in stably keeping the earphone body 110 at the second position, thereby avoiding the failure of the electrical connection between the first electrical connection part 111 and the second electrical connection part 211 as a result of the difficulty in stably keeping the earphone body 110 at the second position. In this way, the stability of the electrical connection between the first electrical connection part 111 and the second electrical connection part 211 is improved, so that the wireless earphone 100 can be stably charged, or the smart glasses 200 can stably supply power to the wireless earphone 100.

In order to further improve the stability of the electrical connection between the first electrical connection part 111 and the second electrical connection part 211, the first electrical connection part 111 may optionally include a first electrical connection terminal 111a and a first connection member 111b, and the second electrical connection part 211 may include a second electrical connection terminal 211a and a second connection member 211b. In a case that the earphone body 110 is located at the first position, the first connection member 111b may be separated from the second connection member 211b, and the first electrical connection terminal 111a may be separated from the second electrical connection terminal 211a. In a case that the earphone body 110 is located at the second position, the first connection member 111b may be connected to the second connection member 211b, and the first electrical connection terminal 111a may be electrically connected to the second electrical connection terminal 211a.

In this case, the first electrical connection terminal 111a and the second electrical connection terminal 211a can realize the electrical connection between the wireless earphone 100 and the smart glasses 200, so that the smart glasses 200 can supply power to or charge the wireless earphone 100. In addition, the first connection member 111b and the second connection member 211b can cause the earphone body 110 to be stably connected to the glasses leg 210, so as to prevent separation of the first electrical connection terminal 111a from the second electrical connection terminal 211a as a result of separation of the earphone body 110 from the glasses leg 210 during the charging of the wireless earphone 100, thereby avoiding the difficulty in stable electrical connection between the first electrical connection terminal 111a and the second electrical connection terminal 211a. In this away, the stability of the electrical connection between the first electrical connection part 111 and the second electrical connection part 211 can be further improved.

The first connection member 111b and the second connection member 211b may have various structures. For example, the first connection member 111b may be a hook, and the second connection member 211b may be a slot. The hook may be detachably matched with the slot, which is not limited in this embodiment of this disclosure. Optionally, one of the first connection member 111b and the second connection member 211b may be a magnetic member, and another may be a magnetic absorber. When the earphone body 110 is located at the second position, the magnetic member is magnetically connected to the magnetic absorber. That is to say, the first connection member 111b may be a magnetic member, and the second connection member 211b may be a magnetic absorber. Certainly, the first connection member 111b may be a magnetic absorber, and the second connection member 211b may be a magnetic member.

Compared with the above structure formed by the hook and the slot matched with each other, such a structure does not require arrangement of a slot or a protrusion on the earphone body 110 or the glasses leg 210, so that appearances of the glasses leg 210 and the earphone body 110 are relatively flat, and the appearances of the wireless earphone 100 and the smart glasses 200 are quite complete, bringing relatively desirable experience to the user during use. Therefore, the user experience is relatively desirable.

It should be noted that magnetic member is a component with magnetism. For example, the magnetic member may be an electromagnet or a permanent magnet. The magnetic absorber is a component that can be magnetically absorbed. For example, the magnetic absorber may be an electromagnet, a permanent magnet, or an iron member.

As described above, the first connection member 111b and the second connection member 211b can cause the earphone body 110 to be stably connected to the glasses leg 210. However, the connection between the earphone body 110 and the glasses leg 210 is not limited to this manner. In an optional embodiment, the first electrical connection part 111 may include a first electrical connection terminal 111a, and the second electrical connection part 211 may include a second electrical connection terminal 211a. In a case that the earphone body 110 is located at the first position, the first electrical connection terminal 111a is separated from the second electrical connection terminal 211a. In a case that the earphone body 110 is located at the second position, the first electrical connection terminal 111a is magnetically and electrically connected to the second electrical connection terminal 211a. That is to say, the first electrical connection terminal 111a and the second electrical connection terminal 211a can cause the earphone body 110 to be stably connected to the glasses leg 210, so as to prevent separation of the first electrical connection terminal 111*a* from the second electrical connection terminal 211*a* as a result of separation of the earphone body 110 from the glasses leg 210 during the charging of the wireless earphone 100, thereby avoiding the difficulty in stable electrical connection between the first electrical connection terminal 111*a* and the second electrical connection terminal 211*a*. In this away, the stability of the electrical connection between the first electrical connection part 111 and the second electrical connection part 211 can be further improved.

Optionally, while the first electrical connection terminal 111*a* and the second electrical connection terminal 211*a* are electrically connected, the first electrical connection terminal 111*a* and the second electrical connection terminal 211*a* are magnetically attracted, so that the earphone body 110 is stably connected to the glasses leg 210. In addition, the first electrical connection part 111 does not require the first connection member 111*b*, and the second electrical connection part 211 does not require the second connection member 211*b*, which helps simplify the structure of the first electrical connection part 111 and the second electrical connection part 211, thereby simplifying the structures of the wireless earphone 100 and the smart glasses 200, and reducing the structural complexity of the wireless earphone 100 and the smart glasses 200.

Optionally, one of the first electrical connection terminal 111*a* and the second electrical connection terminal 211*a* is an elastic electrical connection terminal, and another is an electrical connection sheet. In a case that the earphone body 110 is located at the second position, the elastic electrical connection terminal is electrically connected to the electrical connection sheet. That is to say, the first electrical connection terminal 111*a* may be an elastic electrical connection terminal, and the second electrical connection terminal 211*a* may be an electrical connection sheet. Alternatively, the first electrical connection terminal 111*a* may be an electrical connection sheet, and the second electrical connection terminal 211*a* may be an elastic electrical connection terminal. This disclosure is not limited thereto. The elastic electrical connection terminal may be elastically and electrically connected to the electrical connection sheet, so that the elastic electrical connection terminal can be adaptively adjusted according to an actual distance between the first electrical connection terminal 111*a* and the second electrical connection terminal 211*a*, and is elastically abutted against the electrical connection sheet, to ensure the stability of the electrical connection between the first electrical connection terminal 111*a* and the second electrical connection terminal 211*a*, thereby preventing the failure of the electrical connection as a result of a gap between the first electrical connection terminal 111*a* and the second electrical connection terminal 211*a*.

The elastic electrical connection terminal may be conductive foam, an elastic frame, a pogo pin, or the like, and the electrical connection sheet may be a metal sheet. The specific types of elastic electrical connection terminal and electrical connection sheet are not limited in this embodiment of this disclosure.

In order to facilitate the electrical connection between the first electrical connection part 111 and the second electrical connection part 211 after the earphone body 110 is rotated to the second position, in an optional embodiment, the first electrical connection part 111 and the speaker part 120 may be disposed on a same side of the earphone body 110. After the user wears the wireless earphone 100, the first electrical connection part 111 faces the user side. The glasses leg 210 may include a top surface, a bottom surface, and an outer side surface connecting the top surface and the bottom surface. The second electrical connection part 211 may be disposed on the outer side surface. After the user wears the smart glasses 200, the second electrical connection part 211 faces away from the user side. In this case, after the earphone body 110 is rotated to the second position, the first electrical connection part 111 can be just opposite to the second electrical connection part 211, which helps the user operate the earphone body 110 to realize the electrical connection between the first electrical connection part 111 and the second electrical connection part 211, thereby helping control the wearable device assembly.

Optionally, the first electrical connection part 111 and the speaker part 120 may be respectively disposed on two opposite sides of the earphone body 110. After the user wears the wireless earphone 100, the first electrical connection part 111 may be located on a side of the earphone body 110 facing away from the user. For example, the glasses leg 210 may further include an inner side surface connecting the top surface and the bottom surface. The second electrical connection part 211 may be disposed on the inner side surface. After the user wears the smart glasses 200, the second electrical connection part 211 is located on the inner side surface facing the user. In this case, after the earphone body 110 is rotated to the second position, the earphone body 110 may be located between the user and the glasses leg 210, so that the first electrical connection part 111 can be opposite to the second electrical connection part 211, thereby realizing the electrical connection between the first electrical connection part 111 and the second electrical connection part 211.

Alternatively, the first electrical connection part 111 may be disposed on an end surface of the earphone body 110 away from the speaker part 120, and the second electrical connection part 211 may be disposed on the bottom surface of the glasses leg 210. After the earphone body 110 is rotated to the second position, the end surface of the earphone body 110 away from the speaker part 120 can contact with the bottom surface of the glasses leg 210, thereby realizing the electrical connection between the first electrical connection part 111 and the second electrical connection part 211. In this embodiment of this disclosure, the positions of the first electrical connection part 111 and the second electrical connection part 211 are not limited.

In a case that a length of the earphone body 110 is relatively small, it is difficult to connect the earphone body 110 and the glasses leg 210 after the earphone body is rotated to the second position. Based on the above, in an optional embodiment, the first electrical connection part 111 is retractably disposed in the earphone body 110. In a case that the earphone body 110 is located at the first position, the first electrical connection part 111 may be retracted into the earphone body 110. In a case that the earphone body 110 is located at the second position, at least a portion of the first electrical connection part 111 extends out of the earphone body 110, and is electrically connected to the second electrical connection part 211. The earphone body 110 with the retractable structure can lengthen the earphone body 110, so that the earphone body 110 has a relatively large length. In this way, the earphone body 110 can be more easily connected to the glasses leg 210 after being rotated to the second position, thereby avoiding a difficulty in connecting the earphone body 110 and the glasses leg 210 after the earphone body is rotated to the second position as a result of the relatively small length size of the earphone body 110.

In order to realize a voice call through the wireless earphone 100 for a user, optionally, a microphone is disposed on an end of the earphone body 110 away from the speaker part 120. During use by the user, the earphone body 110 may be rotated to cause the microphone to approach a mouth of the user, so that the wireless earphone 100 can collect relatively clear voice information, which alleviates the distortion during the voice call of the user, thereby improving the user experience of the wireless earphone 100.

The above embodiments of this disclosure focus on the differences between the various embodiments. The various embodiments long may be combined into more optimal embodiments as long as the different optimization features of the various embodiments are not contradictory. For brevity, the details are not described herein.

The foregoing descriptions are merely embodiments of this disclosure, and are not intended to limit this disclosure. For a person skilled in the art, various modifications and variations can be made to this disclosure. Any modification, equivalent replacement, or improvement made without departing from the spirit and principle of this disclosure shall fall within the scope of the claims of this disclosure.

What is claimed is:

1. A wearable device assembly, comprising a wireless earphone and smart glasses, wherein the wireless earphone comprises an earphone body and a speaker part, the earphone body is rotatably connected to the speaker part, the earphone body is rotatably switched between a first position and a second position relative to the speaker part, and the earphone body is provided with a first electrical connection part;

the smart glasses comprise glasses legs and a battery module, one of the glasses legs is provided with a second electrical connection part, and the second electrical connection part is electrically connected to the battery module; and in a case that the earphone body is rotated to the first position relative to the speaker part during use, the earphone body is separated from a glasses leg, and in a case that the earphone body is rotated to the second position relative to the speaker part during use, the earphone body is connected to the glasses leg, and the first electrical connection part is electrically connected to the second electrical connection part.

2. The wearable device assembly according to claim 1, wherein one of the earphone body and the speaker part is provided with a connection hole, another is provided with a connection shaft, the connection shaft is connected to the connection hole, and the connection shaft is rotatably matched with the connection hole.

3. The wearable device assembly according to claim 2, wherein one of an inner wall of the connection hole and an outer wall of the connection shaft is provided with a plurality of elastic protrusions, another is provided with a limiting groove, and the elastic protrusions are limited in and matched with the limiting groove in a rotation direction of the earphone body.

4. The wearable device assembly according to claim 1, wherein the earphone body is electrically connected to the speaker part through a flexible circuit board.

5. The wearable device assembly according to claim 1, wherein the first electrical connection part comprises a first electrical connection terminal and a first connection member, and the second electrical connection part comprises a second electrical connection terminal and a second connection member;

in a case that the earphone body is located at the first position, the first connection member is separated from the second connection member, and the first electrical connection terminal is separated from the second electrical connection terminal; and in a case that the earphone body is located at the second position, the first connection member is connected to the second connection member, and the first electrical connection terminal is electrically connected to the second electrical connection terminal.

6. The wearable device assembly according to claim 5, wherein one of the first connection member and the second connection member is a magnetic member, another is a magnetic absorber, and in a case that the earphone body is located at the second position, the magnetic member is magnetically connected to the magnetic absorber.

7. The wearable device assembly according to claim 1, wherein the first electrical connection part comprises a first electrical connection terminal, and the second electrical connection part comprises a second electrical connection terminal;

in a case that the earphone body is located at the first position, the first electrical connection terminal is separated from the second electrical connection terminal; and in a case that the earphone body is located at the second position, the first electrical connection terminal is magnetically and electrically connected to the second electrical connection terminal.

8. The wearable device assembly according to claim 5, wherein one of the first electrical connection terminal and the second electrical connection terminal is an elastic electrical connection terminal, another is an electrical connection sheet, and in a case that the earphone body is located at the second position, the elastic electrical connection terminal is electrically connected to the electrical connection sheet.

9. The wearable device assembly according to claim 1, wherein the first electrical connection part and the speaker part are disposed on a same side of the earphone body; and the glasses leg comprises a top surface, a bottom surface, and an outer side surface connecting the top surface and the bottom surface, and the second electrical connection part is disposed on the outer side surface.

10. The wearable device assembly according to claim 1, wherein the first electrical connection part is retractably disposed in the earphone body, in a case that the earphone body is located at the first position, the first electrical connection part is retracted into the earphone body, and in a case that the earphone body is located at the second position, at least a portion of the first electrical connection extends out of the earphone body, and is electrically connected to the second electrical connection part.

11. The wearable device assembly according to claim 1, wherein a microphone is disposed on an end of the earphone body away from the speaker part.

\* \* \* \* \*